United States Patent [19]

Johanson

[11] Patent Number: 5,398,147
[45] Date of Patent: Mar. 14, 1995

[54] CASSETTE BASE WITH TRIANGULAR STRENGTHENING BRACES

[75] Inventor: Bradley J. Johanson, Hutchinson, Minn.

[73] Assignee: Minnesota Mining and Manufacturing Company, St. Paul, Minn.

[21] Appl. No.: 168,968

[22] Filed: Dec. 16, 1993

Related U.S. Application Data

[63] Continuation of Ser. No. 877,485, May 1, 1992, abandoned.

[51] Int. Cl.⁶ .............................................. G11B 23/04
[52] U.S. Cl. ...................................... 360/132; 242/347
[58] Field of Search ................ 360/132; 242/199, 198, 242/338.1, 338.3, 343, 343.1, 343.2, 347

[56] References Cited

U.S. PATENT DOCUMENTS

| | | | |
|---|---|---|---|
| 4,106,724 | 8/1978 | Higashida | 242/198 |
| 4,114,833 | 9/1978 | Liepold | 242/199 |
| 4,232,841 | 11/1980 | Hashimoto | 242/199 |
| 4,428,547 | 1/1984 | Gotoh | 242/199 |
| 4,428,548 | 1/1984 | Gotoh | 360/74.6 |
| 4,512,534 | 4/1985 | Coy, Jr. et al. | 242/198 |
| 4,513,928 | 4/1985 | Hackett | 360/132 |
| 4,623,105 | 11/1986 | Pertzsch et al. | 360/132 |
| 4,706,149 | 11/1987 | Machida et al. | 360/132 |
| 4,739,949 | 4/1988 | Lin | 360/132 |
| 4,801,107 | 1/1989 | Dixon et al. | 242/199 |
| 4,802,045 | 1/1989 | Yamamoto et al. | 360/132 |
| 4,847,718 | 7/1989 | Miller et al. | 360/132 |
| 4,889,296 | 12/1989 | Watanabe et al. | 242/199 |
| 4,901,171 | 2/1990 | Urayama et al. | 360/132 |
| 4,989,111 | 1/1991 | Sato | 360/132 |
| 4,993,661 | 2/1991 | Tollefson | 242/188 |
| 5,024,394 | 6/1991 | Ozawa et al. | 360/132 |
| 5,052,634 | 10/1991 | Bushwood et al. | 242/198 |
| 5,056,735 | 10/1991 | Geraldi et al. | 360/132 |
| 5,224,005 | 6/1993 | Fujii | 360/132 |

FOREIGN PATENT DOCUMENTS

| | | |
|---|---|---|
| 0060497 | 9/1982 | European Pat. Off. . |
| 0175347 | 3/1986 | European Pat. Off. . |
| 0286691 | 10/1988 | European Pat. Off. . |
| 0411622 | 2/1991 | European Pat. Off. . |
| 35 02 536 | 8/1985 | Germany . |
| 2-179977 | 7/1990 | Japan ................ 360/132 |
| 2216496 | 10/1989 | United Kingdom . |

*Primary Examiner*—John H. Wolff
*Assistant Examiner*—Craig A. Renner
*Attorney, Agent, or Firm*—Gary L. Griswold; Walter N. Kirn; Charles D. Levine

[57] ABSTRACT

A cassette base includes a lower wall, two side walls perpendicular to the lower wall, a front wall perpendicular to the lower and side walls, and a rear wall opposing the front wall and perpendicular to the lower and side walls. An insert area is disposed on the lower wall adjacent the rear wall for receiving a reel brake mechanism. The insert area includes a front wall and two opposing side walls. Each side wall has a notch for receiving and holding a reel brake mechanism and is spaced from the base rear wall. At least one strengthening brace connects the rear and lower walls.

4 Claims, 3 Drawing Sheets

CASSETTE BASE WITH TRIANGULAR STRENGTHENING BRACES

This is a continuation of application Ser. No. 07/877,485, filed May 1, 1992, now abandoned.

TECHNICAL FIELD

The present invention relates to molded parts. More particularly, the present invention relates to molded cassette parts.

BACKGROUND OF THE INVENTION

Cassettes for holding reels of magnetic recording tape are well-known, and videocassettes for home use are sold commercially in large volumes into a very price-competitive market. Videocassettes typically include a housing having a reel of magnetic recording tape called the supply reel and a take-up reel. One end of the tape on the supply reel is attached to the take-up reel. As shown in FIG. 1, the housing typically includes a lower half, called the base 10, and an upper half, called the cover (not shown). A door (not shown), which protects the exposed length of tape 16 running between the supply reel 18 and the take-up reel 20 when the cassette is not in use, is attached to the cover. These cassettes operate in a videocassette recorder (VCR) which is capable of both playing and recording.

The tape 16 follows a prescribed path from the supply reel 18, over various tape guides, out of the housing, across a planar area called the left bridge 22, across an open area 24 where the tape 16 is unsupported, to a planar area called the right bridge 26, and back into the housing to the take-up reel 20. The long side of the cassette on which the bridges 22, 26 are located is the front 28 of the cassette, and the long side opposite the front side of the cassette is the rear 30 of the cassette.

The end of the cassette nearest the supply reel 18 is the left end 32 of the cassette, and the end of the cassette nearest the take-up reel 20 is the right end 34. These conventions are consistent with the manner in which a videocassette is typically inserted into the VCR; the front 28 of the cassette enters the machine first, with the base 10 on the bottom and the rear 30 of the cassette trailing.

Several other parts are also included in the cassette which enable the entire device to be safely and conveniently placed in a compatible machine for recording or playing. These parts include reel brakes 36, 38, which pivot on pins 40, 42, which typically are molded as part of the base 10. The reel brakes 36, 38 keep the reels 18, 20 from unrolling the tape 16 when the cassette is out the VCR. Other safety devices signal the VCR that the end of the tape 16 has been reached, thereby preventing damage to the recorded material.

The base 10 and cover fit together to enclose tape reels 18, 20, along with the other internal parts, to exclude contaminants and protect the tape 16 from damage. Alignment of the cover with the base 10 is assured by screw bosses 44 in the base 10 which mate with corresponding bosses in the cover.

A significant part of the cassette cost arises from the size and complexity of the base 10 and cover. Videocassette housings typically are injection molded using a synthetic resin such as polystyrene or acrylonitrile-butadiene-styrene (ABS). Molds for the base 10 and cover are typically designed to pull apart vertically, with one half of the mold forming substantially all of the internal parts of the base 10 or cover, and the other half forming the outside surfaces of the part. Since videocassette housings have large wall areas, reducing wall thickness is important to minimizing injection molding costs. Molding the walls and the integral components contribute to part cost not only through the quantity of material used in the part, but also through the time required to cool the part before ejection from the mold. While material consumption is proportional to the first power of wall thickness, the cooling time required before a part can be ejected from a mold is more nearly proportional to the square of the wall thickness. Since cooling the part sufficiently to allow ejection without warping or other damage consumes about 80% of the total molding time, it is clear that reduction of wall thickness presents significant opportunities for increasing the productivity of the videocassette manufacturing process.

Another factor in determining wall thickness is resin flow during injection molding. During injection of the material into the mold, the various parts of the mold serve not only to determine the size and shape of the part being molded, but also act as passages through which the molten plastic must flow to reach other parts of the mold. If a wall section is too thin, the portion of the mold forming that wall section will be correspondingly thin, thereby restricting flow, and causing excessive reduction in injection pressure at points farther from the point of injection, or gate. As a result, the injection pressure may have to be raised, or the injection time may have to be lengthened, or both.

Increasing injection pressure can create undesirable side effects. U.S. Pat. No. 4,706,149 describes the ejection difficulties which can arise when injection pressures are high. Additionally, polymeric materials which are forced to flow through very thin channels at the high shear rates produced by high injection pressures often undergo excessive orientation of the polymer chains, which can weaken the part and directionally vary shrink rates, which can, in turn, lead to warping.

Since cassette bases and covers have sections having a variety of shapes and thicknesses, these various sections will require different times to cool during injection molding. The overall cooling time required for the part will be determined by the slowest cooling section, called the "critical section for cooling." Further, as the cooling time for some sections is shortened by thinning, it is possible that another section may become the critical section. Therefore, thinning of only the wall sections may not be sufficient to significantly shorten the overall cooling time for the part.

None of the known configurations for cassette bases and covers shorten the cooling time during injection molding for sections other than the wall sections.

SUMMARY OF THE INVENTION

A videocassette base includes a lower wall, two opposing side walls perpendicular to the lower wall, a front wall perpendicular to the lower wall and the side walls, and a rear wall opposing the front wall and perpendicular to the lower wall and the side walls. The side walls define the left and right ends of the cassette while the respective front and rear walls define the front and rear of the cassette. Supply reel and take-up reel spindle access holes in the lower wall receive drive spindles for the respective supply and take-up reels. The base is typically produced by injection molding of a thermoplastic material in which a gate for injecting the molding material is located on the bottom of the cassette.

A center insert includes walls and serves to hold a reel brake lever in notches and to provide reinforcement to the outside wall. These walls also serve as flow channels for conveying molding material to the outside wall during injection. The injection gate is located adjacent the wall. By removing sections of these walls that extend to the outside wall, and replacing them with triangular strengthening braces shortens the fill time. The triangular strengthening braces improve the surface quality of the outside wall. In particular, the triangular strengthening braces can be designed to avoid leaving sink marks on the outside surface of the outside wall and to reduce the appearance of weld lines and flow lines.

DETAILED DESCRIPTION OF PREFERRED EMBODIMENTS

Figure 1:
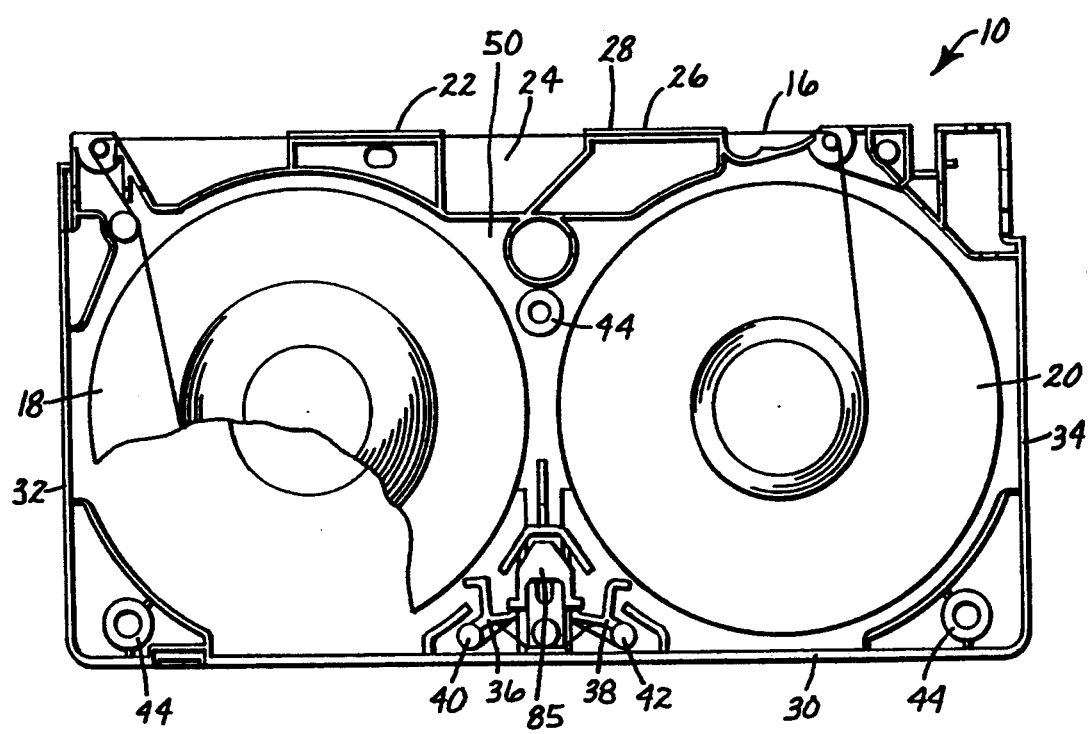
FIG. 1 is a plan view of the base of a videocassette with a known center insert portion.

A videocassette base having a known center insert is shown in FIG. 1 and includes a lower wall 50, two opposing side walls perpendicular to the lower wall, a front wall perpendicular to the lower wall and the side walls, and a rear wall opposing the front wall and perpendicular to the lower wall and the side walls. The side walls define the left and right ends 32, 34 of the cassette while the respective front and rear walls define the front 28 and rear 30 of the cassette. Supply reel and take-up reel spindle access holes in the lower wall 50 receive drive spindles for the respective supply and take-up reels. The base 10 is typically produced by injection molding of a thermoplastic material in which a gate for injecting the molding material is located on the bottom of the cassette.

Figure 3:
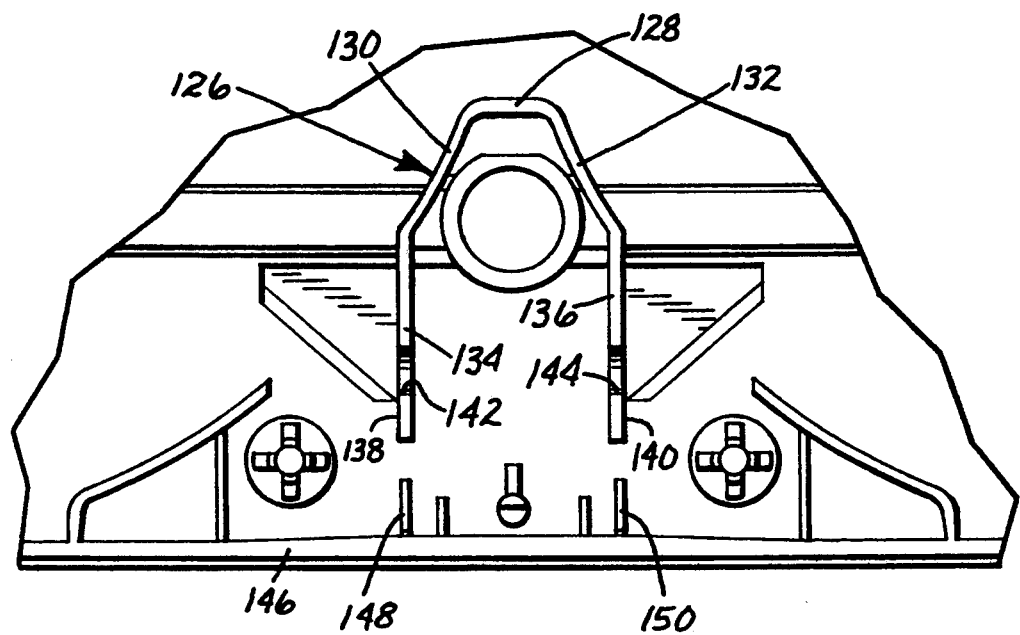
FIG. 3 is a top view of the cassette of FIG. 2.
Figure 2:
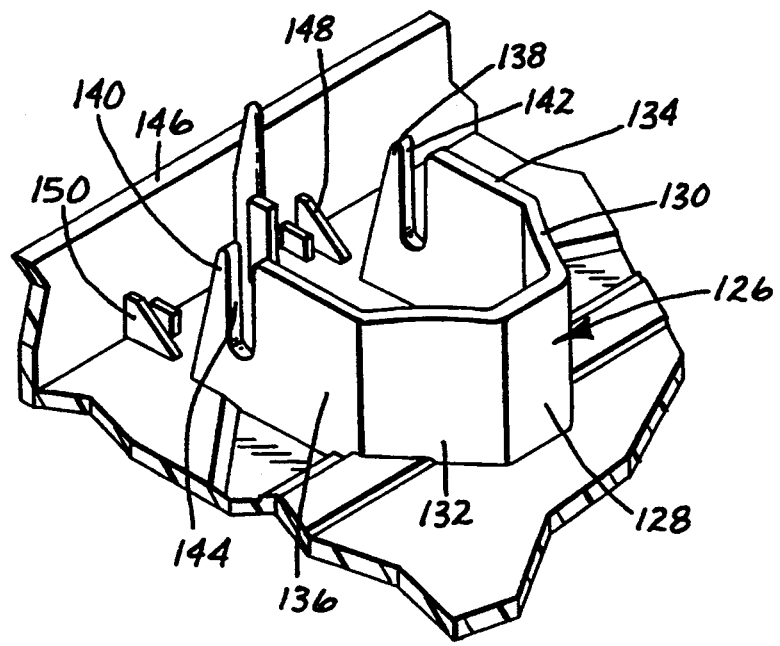
FIG. 2 is a perspective view of the center insert of the cassette according to the present invention.

A center insert 126 according to the present invention, shown in FIGS. 2 and 3, includes walls 128, 130, 132, 134, 136, 138, 140. In a conventional cassette, the center insert serves primarily to hold a reel brake lever in notches 142, 144 and to provide reinforcement to the outside wall 146 which is the rear 30 of the cassette. These walls also serve as flow channels for conveying molding material to the outside wall 146 during injection. The injection gate is located adjacent the wall 128.

Normally, it is expected that providing more flow channels would improve filling and decrease injection fill time, to decrease cycle time. However, it has been found that the fill time can be shortened by removing sections of these walls that extend to the outside wall 146, and replacing them with triangular strengthening braces 148, 150. By eliminating the flow of material through the center insert 126 to the outside wall 146, more material is diverted to other, slower filling areas, resulting in a net overall shortening of fill time.

It has also been found that the triangular strengthening braces 148, 150 improve the surface quality of the outside wall 146. In particular, the triangular strengthening braces 148, 150 can be designed to avoid leaving sink marks on the outside surface of the outside wall 146. Another type of defect which has been reduced by the triangular strengthening braces 148, 150 is the appearance of weld lines. Weld lines occur when, during molding, plastic flows to an area by two different paths, such as through the walls 138, 140, with the flow fronts from each path meeting to form a weld line, which remains visible on the finished part. Another closely related surface defect which is reduced by the triangular strengthening braces 148, 150 is the flow line, which is a wavy line caused by certain unsatisfactory flow patterns.

Figure 4:
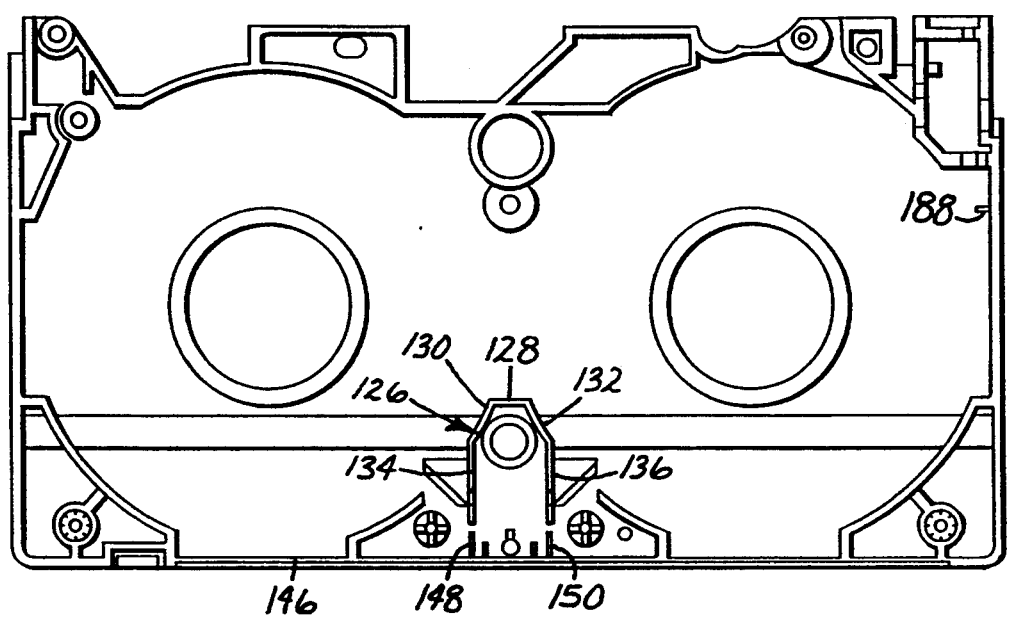
FIG. 4 is a plan view of the base of the cassette of FIG. 2.

Additionally, as shown in FIG. 4, a triangular strengthening brace or gusset 188 can be formed on the side wall at the right end 34 of the cartridge to improve the surface quality of that wall, as shown in FIG. 1. Also, a similar triangular strengthening brace or gusset can be formed in a corresponding location on the right end side wall of the cover (not shown) of the cassette. Thus, the base and cover gussets 188 would oppose each other on the same side of the cartridge. Alternatively, gussets could be formed on the left side, both sides, or with one on one side of the base and another on the other side of the cover.

Numerous characteristics, advantages, and embodiments of the invention have been described in detail in the foregoing description with reference to the accompanying drawings. However the disclosure is illustrative only and the invention is not intended to be limited to the precise embodiments illustrated. Various changes and modifications may be effected therein by one skilled in the art without departing from the scope or spirit of the invention. For example, although the invention has been described with respect to videocassettes, the invention has application with any cassette type formed by molding.

I claim:

1. A cassette base comprising:
   a base lower wall;
   two opposing base side walls perpendicular to the base lower wall;
   a base front wall perpendicular to the base lower wall and the base side walls;
   a base rear wall opposing the base front wall and perpendicular to the base lower wall and the base side walls;
   an insert area disposed on the base lower wall adjacent the base rear wall and comprising:
   a front wall;
   two opposing side walls, wherein each insert area side wall extends from the base lower wall and has a notch for receiving and holding a reel brake mechanism and wherein each insert area side wall does not contact and is spaced from the base rear wall; and
   at least one strengthening brace, separate from the insert area side walls, connecting the base rear wall and the base lower wall, wherein the strengthening brace is substantially coplanar with one of said insert area side walls.

2. The cassette base of claim 1 further comprising an additional strengthening brace connecting the base rear wall and the base lower wall.

3. The cassette base of claim 1 wherein the strengthening brace is triangular.

4. The cassette base of claim 1 further comprising at least one strengthening brace connecting one of said base side walls and the base lower wall.

* * * * *